United States Patent
Motoyama

(10) Patent No.: US 10,451,205 B2
(45) Date of Patent: Oct. 22, 2019

(54) CLAMP COUPLING AND METHOD OF FASTENING THE SAME

(71) Applicant: KABUSHIKI KAISHA TOYOTA JIDOSHOKKI, Aichi-ken (JP)

(72) Inventor: Yuto Motoyama, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 251 days.

(21) Appl. No.: 15/591,379

(22) Filed: May 10, 2017

(65) Prior Publication Data
US 2017/0328501 A1   Nov. 16, 2017

(30) Foreign Application Priority Data

May 16, 2016 (JP) .................................. 2016-097850

(51) Int. Cl.
| | |
|---|---|
| *F16L 23/08* | (2006.01) |
| *F01N 13/18* | (2010.01) |
| *F01N 3/021* | (2006.01) |

(52) U.S. Cl.
CPC .......... *F16L 23/08* (2013.01); *F01N 13/1855* (2013.01); *F01N 3/0211* (2013.01);
(Continued)

(58) Field of Classification Search
CPC .... F16L 23/08; F01N 13/1855; F01N 3/0211; Y10T 24/1443; Y10T 24/1445; Y10T 29/49398; Y10S 29/003
(Continued)

(56) References Cited

U.S. PATENT DOCUMENTS

| 5,697,650 | A |   | 12/1997 | Brown |
| 5,944,365 | A | * | 8/1999 | Kizler ..................... F16L 21/06 |
| | | | | 29/890.08 |

(Continued)

FOREIGN PATENT DOCUMENTS

| CN | 103443520 | 12/2013 |
| CN | 104718406 | 6/2015 |

(Continued)

OTHER PUBLICATIONS

Extended European Search Report issued in EP Appl. No. 17 16 8642.1 dated Sep. 18, 2017.

(Continued)

*Primary Examiner* — Greg Binda
(74) *Attorney, Agent, or Firm* — Greenblum & Bernstein, P.L.C.

(57) ABSTRACT

A clamp coupling includes clamp segments and a connecting section including a fastening section and a contact section. The contact section connects the clamp segments and includes a changing means to change a spaced distance between the clamp segments. The fastening section includes an externally threaded body and an internally threaded body for holding the clamp segments thereby to reduce the spaced distance between the clamp segments and connect objects. A method of fastening the clamp coupling includes holding the shim in the contact section between one ends of the clamp segments in a case that adjustment is made so that a circumferential length of the clamp segments is increased and removing the shim from the contact section so that the clamp segments are brought into direct contact with each other in a case that adjustment is made so that the circumferential length of the clamp segments is shortened.

11 Claims, 8 Drawing Sheets

(52) U.S. Cl.
CPC .......... *Y10S 29/003* (2013.01); *Y10T 24/1443* (2015.01); *Y10T 24/1445* (2015.01); *Y10T 29/49398* (2015.01)

(58) Field of Classification Search
USPC ................ 285/411, 421; 422/177; 29/890.08
See application file for complete search history.

(56) References Cited

U.S. PATENT DOCUMENTS

| | | | | |
|---|---|---|---|---|
| 7,753,414 | B2* | 7/2010 | Hauki | F16L 33/04 |
| | | | | 285/421 |
| 7,779,624 | B2* | 8/2010 | Belisle | F01N 3/0211 |
| 9,863,564 | B2* | 1/2018 | Sato | F16L 23/08 |
| 2005/0253380 | A1 | 11/2005 | Gibb et al. | 285/111 |
| 2005/0258648 | A1 | 11/2005 | Newman | 285/364 |
| 2006/0067860 | A1 | 3/2006 | Faircloth, Jr. et al. | 422/171 |
| 2008/0290658 | A1 | 11/2008 | Kimura et al. | 285/366 |
| 2013/0212842 | A1 | 8/2013 | Rigollet et al. | |
| 2015/0204471 | A1 | 7/2015 | Sato | |
| 2015/0240845 | A1 | 8/2015 | Mann et al. | 24/279 |

FOREIGN PATENT DOCUMENTS

| | | |
|---|---|---|
| EP | 2 877 769 | 6/2015 |
| GB | 2 446 813 | 8/2008 |
| JP | 4-210107 | 7/1992 |
| JP | H09-021405 | 1/1997 |
| JP | 2003-120277 | 4/2003 |
| JP | 3113415 | 9/2005 |
| JP | 2007-147011 | 6/2007 |
| JP | 2011-17444 | 1/2011 |
| KR | 10-2015-0100505 | 9/2015 |
| WO | 2006/029201 | 3/2006 |
| WO | 2012/059675 | 5/2012 |
| WO | 2014/016721 | 1/2014 |

OTHER PUBLICATIONS

Chinese Office Action in counterpart Chinese Application No. 201710332746.6 dated Mar. 28, 2019.

* cited by examiner

CLAMP COUPLING AND METHOD OF FASTENING THE SAME

BACKGROUND OF THE INVENTION

The present invention relates to a clamp coupling that connects a plurality of objects to be connected with each other by holding the connecting objects in a circular groove and also to a method of fastening the clamp coupling.

In a diesel particulate filter (hereinafter referred to as DPF) for purifying exhaust gas discharged from a diesel engine, oil-derived calcium compound substance is deposited in the filter. In order to maintain the desired purifying performance of the DPF, it needs to be cleaned for refreshment. Japanese Patent Application Publication No. 2003-120277 discloses a device for purifying exhaust gas from an internal combustion engine. The DPF which is accommodated in a cylindrical case needs to be removed therefrom for cleaning of the DPF. For this purpose, the cylindrical case is configured to include two halves that are separable from each other. Each cylindrical case half has a circular flange portion and the cylindrical case halves are connected together at the flange portions thereof by a clamp coupling. The clamp coupling includes circular clamp segments each having therein a groove of U or V section. The clamp segments extend around the cylindrical case while holding therebetween the flange portions in the grooves.

The clamp coupling should preferably be reused after the clamp coupling is removed. However, there are problems in reusing the clamp coupling. The clamp segments of the clamp coupling are made of spring steel. The clamp segments having therebetween the flange portions of the cylindrical case exert the spring force in a direction that holds the flange portions. If the clamp coupling holding the flange portions of the cylindrical cases is exposed to heat of exhaust gas through the cylindrical cases, creep occurs in the clamp coupling, so that spring force of the clamp segments is reduced and such insufficient spring force renders the clamp coupling inappropriate for reuse.

The present invention which has been made in light of the problems mentioned above is directed to providing a clamp coupling to connect a plurality of objects to be connected with each other. The clamp coupling has a plurality of clamp segments having the connecting objects held therebetween and disposed in a manner that may shorten the circumferential length thereof so as to ensure a spring force that is required for connecting the plural objects even after creep occurs in the clamp segments.

SUMMARY OF THE INVENTION

In accordance with a first aspect of the present invention, there is provided a clamp coupling including a plurality of clamp segments including respective grooves each having a U or V sectional shape and a connecting section having a first connecting section and a second connecting section for connecting the clamp segments. The plural clamp segments are connected in a ring shape with the groove facing inward of the ring shape. The clamp segments are configured to hold a plurality of objects to be connected in the grooves and connect the objects. The first connecting section is configured to serve as a hinge that permits the clamp segments to be opened from and closed to the ring shape. The second connecting section is configured to connect the plural clamp segments and to permit adjustment of a circumferential length of the plural clamp segments having the ring shape, wherein the second connecting section includes a fastening section and a contact section disposed outward of the ring shape from the fastening section. The contact section connects the clamp segments at one ends thereof in direct or indirect contact with each other and includes a changing means to change a spaced distance between the one ends of the clamp segments. The fastening section includes an externally threaded body inserted through the one ends and an internally threaded body screwed with the externally threaded body for holding the one ends and fastening the clamp segments thereby to reduce the spaced distance between the one ends of the clamp segments and connect the objects held in the grooves.

In accordance with a second aspect of the present invention, there is provided a method of fastening a clamp coupling. The clamp coupling includes a plurality of clamp segments including respective grooves each having a U or V sectional shape and a connecting section having a first connecting section and a second connecting section for connecting the clamp segments. The plural clamp segments are connected in a ring shape with the groove facing inward of the ring shape. The clamp segments are configured to hold a plurality of objects to be connected in the grooves and connect the objects. The first connecting section is configured to serve as a hinge that permits the clamp segments to be opened from and closed to the ring shape. The second connecting section is configured to connect the plural clamp segments and to permit adjustment of a circumferential length of the plural clamp segments having the ring shape, wherein the second connecting section includes a fastening section and a contact section disposed outward of the ring shape from the fastening section. The contact section connects the clamp segments at one ends thereof in direct or indirect contact with each other and includes a changing means to change a spaced distance between the one ends of the clamp segments. The fastening section includes an externally threaded body inserted through the one ends and an internally threaded body screwed with the externally threaded body for holding the one ends and fastening the clamp segments thereby to reduce the spaced distance between the one ends of the clamp segments and connect the objects held in the grooves. The method includes holding the shim as the changing means in the contact section between the one ends of the clamp segments in a case that adjustment is made so that the circumferential length of the plural clamp segments connected in the ring shape is increased and removing the shim from the contact section so that the one ends of the clamp segments are brought into direct contact with each other in a case that adjustment is made so that the circumferential length of the clamp segments is shortened.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

Figure 1:
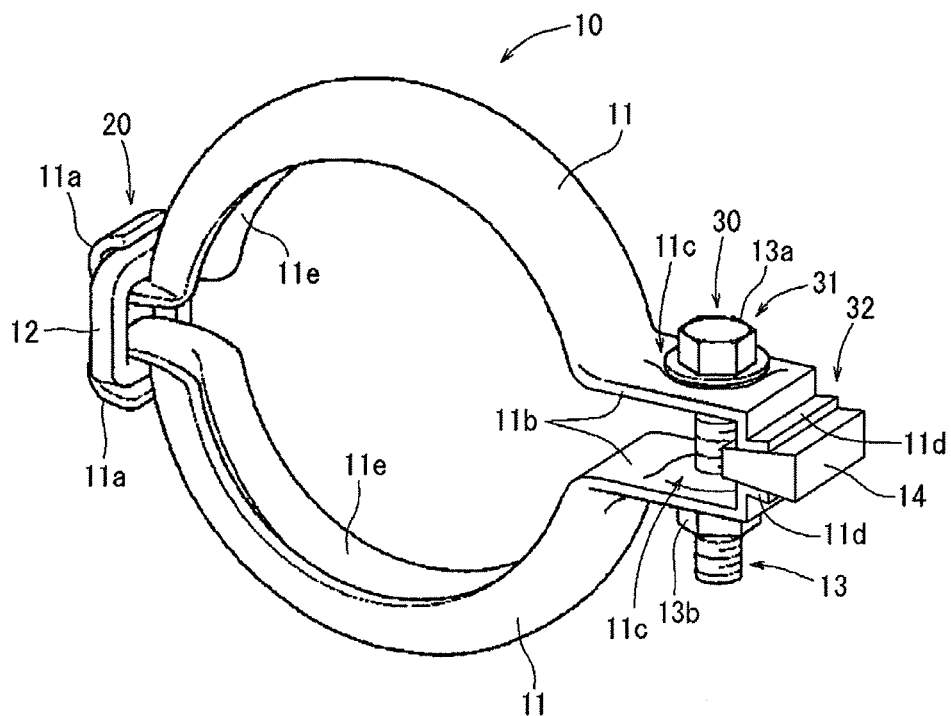
FIG. 1 is a perspective view of a clamp coupling according to an embodiment of the present invention.
Figure 2:
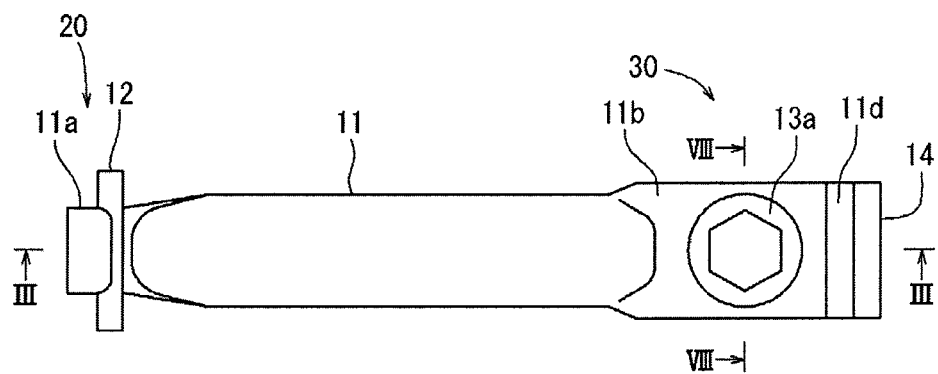
FIG. 2 is a plane view of the clamp coupling of FIG. 1.

The following will describe a clamp coupling according to an embodiment of the present invention with reference to FIGS. 1 to 8. Referring to FIG. 1, there is shown a clamp coupling 10. The clamp coupling 10 includes a pair of clamp segments 11 that are combined to form a ring shape. Each clamp segment 11 has a groove 11e that has a U-shaped section and faces inward of the ring shape. The clamp segment 11 is made of spring steel. It is noted that the groove 11e may have a V-shaped section. As will be described later, the clamp coupling 10 holds a plurality of objects in the grooves 11e and connects the objects.

The paired clamp segments 11 are connected at the ends thereof by two connecting sections including a first connecting section 20 and a second connecting section 30. The first connecting section 20 of the clamp coupling 10 is configured to serve as a hinge that permits the paired clamp segments 11 to be opened to receive therein objects to be connected and to be closed into a ring shape to hold the connecting objects. The second connecting section 30 is configured to have a function to fasten the paired clamp segments 11 together and also to adjust the circumferential length of the clamp segments 11 when fastened together.

In the first connecting section 20, a connecting ring 12 having a ring shape is fitted over one ends of the respective clamp segments 11. The one ends of the respective clamp segments 11 have bend portions 11a that are formed by bending the one ends to prevent the connecting ring 12 from being slipped off the clamp segments 11. The first connecting section 20 may be configured in any other suitable form as long as its intended function is performed.

In the second connecting section 30, the other ends of the respective clamp segments 11 are formed in a flat plate shape and bent so as to extend radially outward of the ring shape of the paired clamp segments 11. The plate-shaped ends of the clamp segments 11 are disposed facing each other. Each flat plate-shaped end is bent at two positions to provide two bend portions. That is, a pair of first bend portions 11b and a pair of second bend portions 11d are formed in this order radially outward of the clamp coupling 10 and serve as the bend section in the present invention. The spaced distance between the second bend portions 11d facing each other is smaller than the spaced distance between the first bend portions 11b facing each other. The second bend portions 11d hold a shim 14 therebetween. The second bend portions 11d and the shim 14 cooperate to constitute a contact section 32. The contact section 32 is disposed at a position adjacent to the one ends of the clamp segments 11, or on the one ends side of the bend section in the present invention. The first bend portions 11b are fastened together by a fastener 13 which includes a bolt 13a and a nut 13b. The spaced distance between the first bend portions 11b of the clamp segments 11 is adjustable by tightening degree of the bolts 13a. The first bend portions 11b and the fastener 13 cooperate to constitute a fastening section 31.

In the above configuration, the clamp coupling 10 holds a plurality of connecting objects in the grooves 11e and the connecting objects are fastened by the bolt 13a and nut 13b. By so doing, the spaced distance between the second bend portions 11d having the shim 14 therebetween is reduced. Therefore, the paired clamp segments 11 having the connecting objects held therebetween are elastically deformed, with the result that the connecting objects receiving uniform tightening force of the clamp segments 11 over the entire periphery are connected together uniformly over the circumference thereof.

Figure 3:
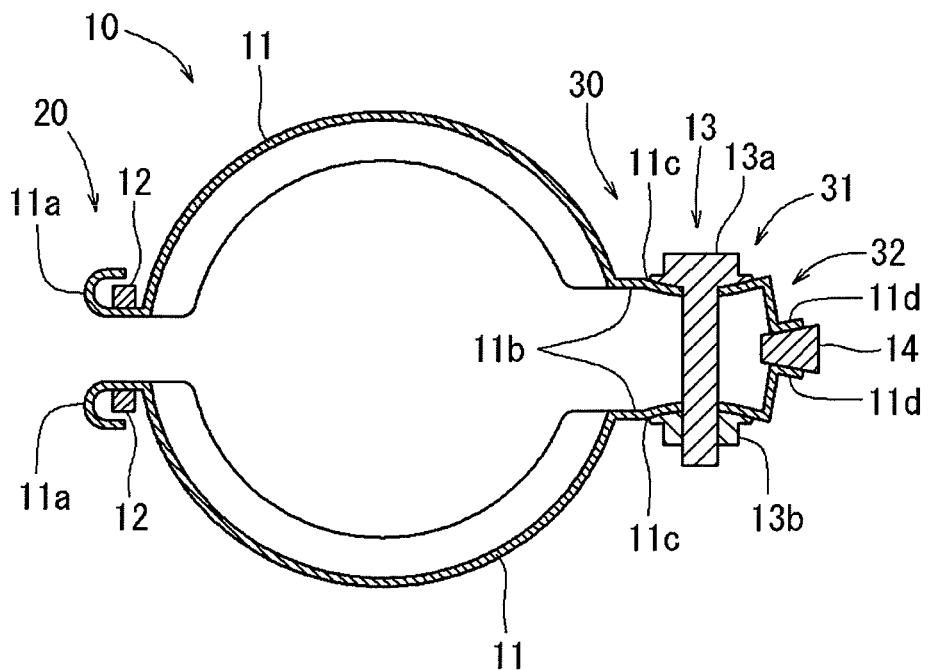
FIG. 3 is a sectional view taken along the line of FIG. 2.
Figure 4:
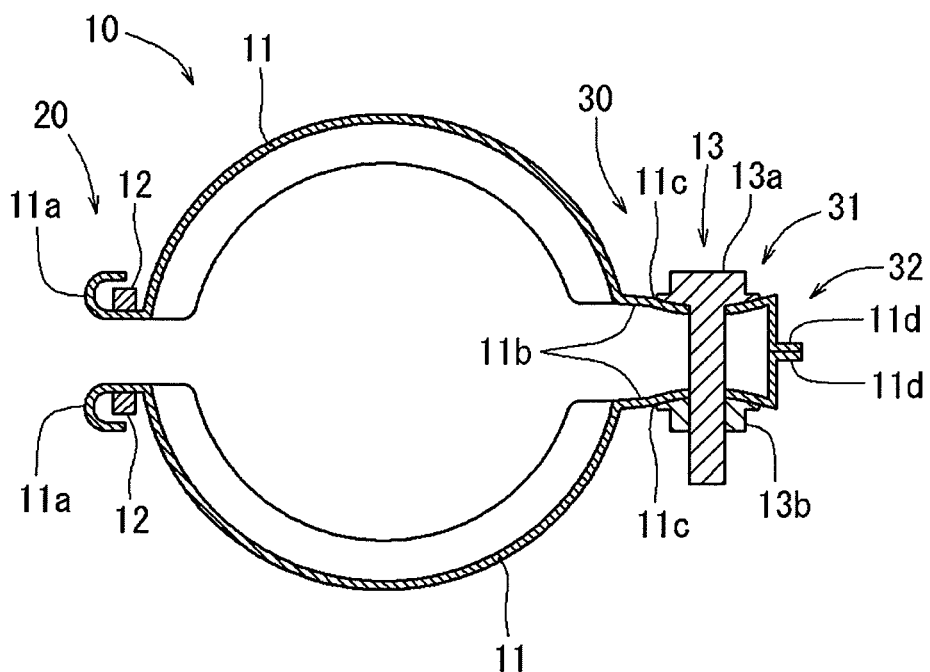
FIG. 4 is a sectional view similar to FIG. 3, but showing a state in which a shim is removed.
Figure 5:
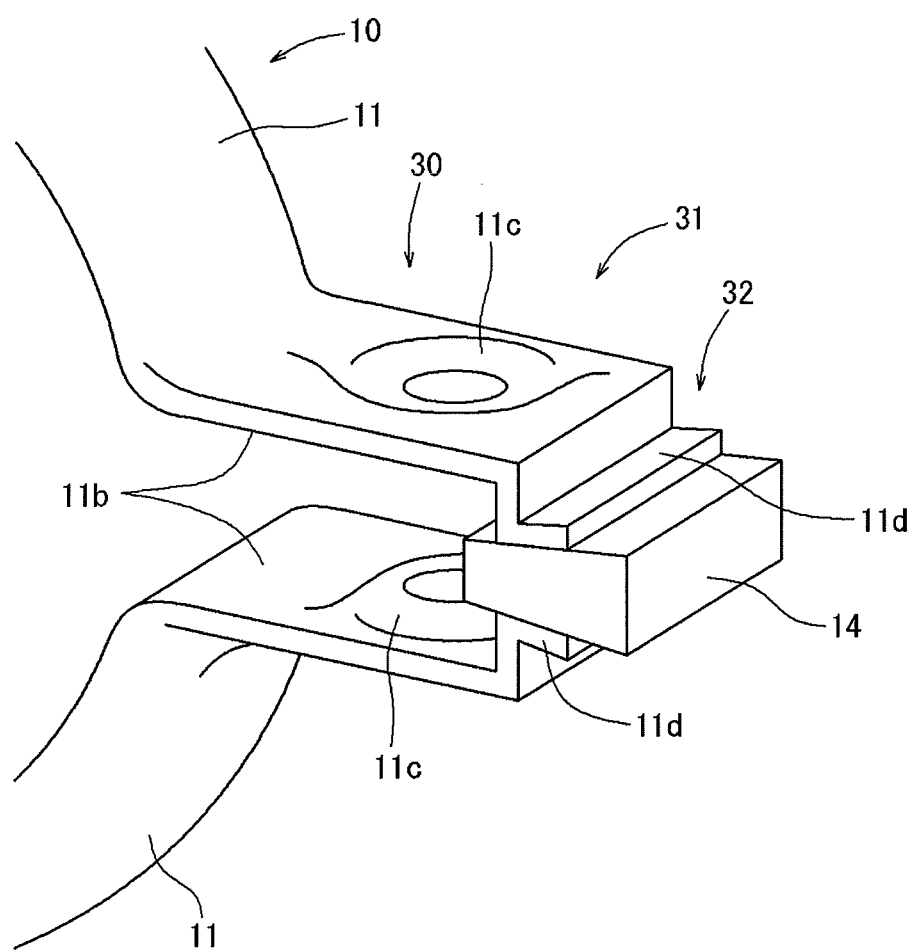
FIG. 5 is a fragmentary enlarged perspective view of a second connecting section of the clamp coupling of FIG. 1, showing a state in which a bolt and a nut are removed.

FIG. 3 shows a state in which the circumferential length of the paired clamp segments 11 connected annularly is lengthened by the shim 14 held between the second bend portions 11d of the second connecting section 30. FIG. 4 shows a state in which the circumferential length of the paired clamp segments 11 connected annularly is shortened by not using the shim 14 between the second bend portions 11d of the second connecting section 30. Thus, depending on whether the second bend portions 11d hold the shim 14 therebetween or not, the diameter of a circle which is formed by the paired clamp segments 11 and hence the circumferential length of the circle is changed. The shim 14 corresponds to the changing means of the present invention.

Figure 10:
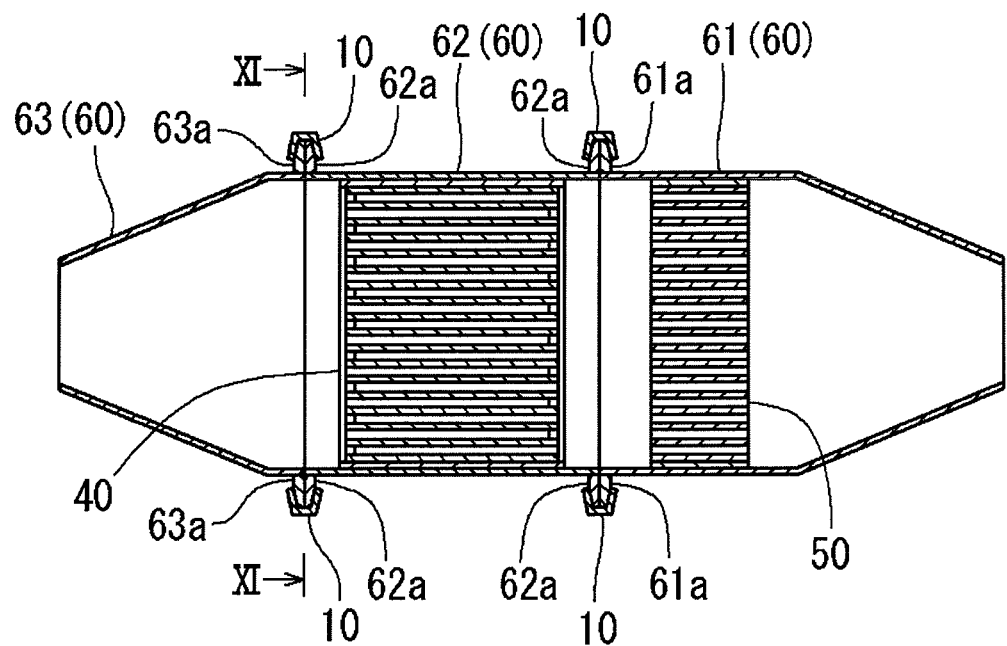
FIG. 10 is an explanatory view of a device for purifying exhaust gas of an engine, which are assembled with the clamp couplings of FIG. 1.
Figure 11:
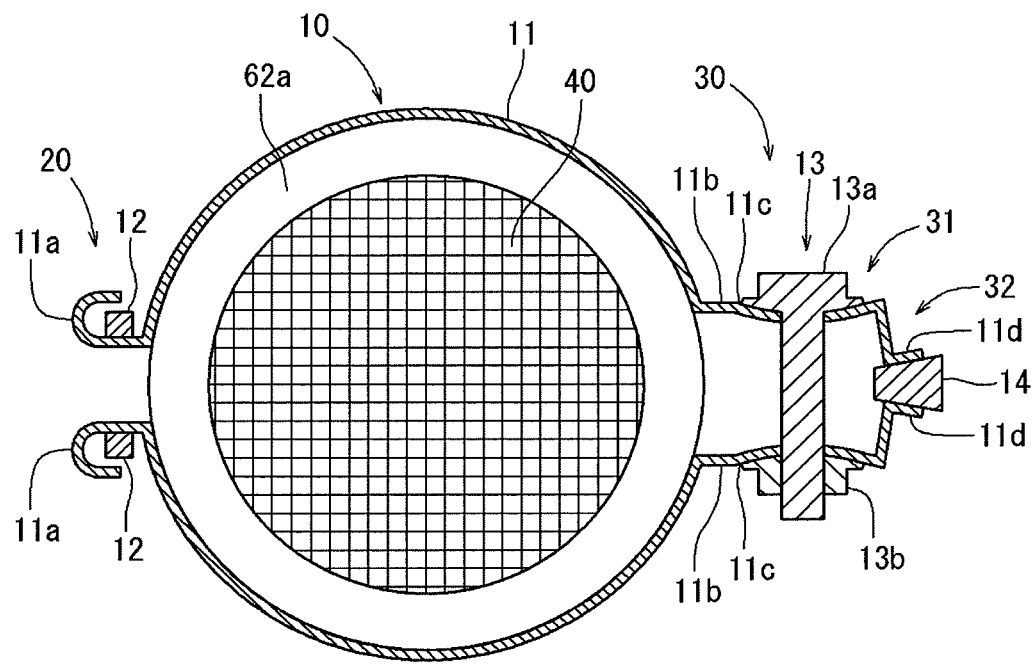
FIG. 11 is a sectional view taken along the line XI-XI of FIG. 10.

Referring to FIG. 10, there is shown a device for purifying exhaust gas of a diesel engine. The device includes a cylindrical case 60 having therein an oxidation catalyst 50 and a diesel particulate filter 40 (hereinafter referred to as DPF) disposed in this order along the flowing direction of exhaust gas. The cylindrical case 60 has a three-piece structure that includes cylindrical cases 61, 62, 63 and permits removal of the DPF 40 from the cylindrical case 60 for cleaning the DPF 40. The oxidation catalyst 50 and the DPF 40 are accommodated in the cylindrical case 61 and the cylindrical case 62, respectively. The cylindrical case 63 is disposed downstream of the cylindrical case 62 in the flowing direction of exhaust gas. The cylindrical cases 61, 62, and 63 have flange portions 61a, 62a, 63a, respectively, and the flange portions of any two adjacent cylindrical cases face each other. The cylindrical cases 61, 62, and 63 corresponding to the connecting objects cooperate to form the integrated cylindrical case 60 with the flange portions 61a, 62a connected together and the flange portions 62a, 63a connected together, respectively, with the clamp couplings 10. That is, the flange portions 61a, 62a and the flange portions 62a, 63a are held in the grooves 11e (FIG. 1) of the clamp couplings 10 and each cylindrical case 61, 62, and 63 is connected by being fastened with the fastener 13 (FIG. 1) of the clamp coupling 10. FIG. 11 shows a state in which the cylindrical cases 62, 63 are connected with the clamp coupling 10.

Figure 12:
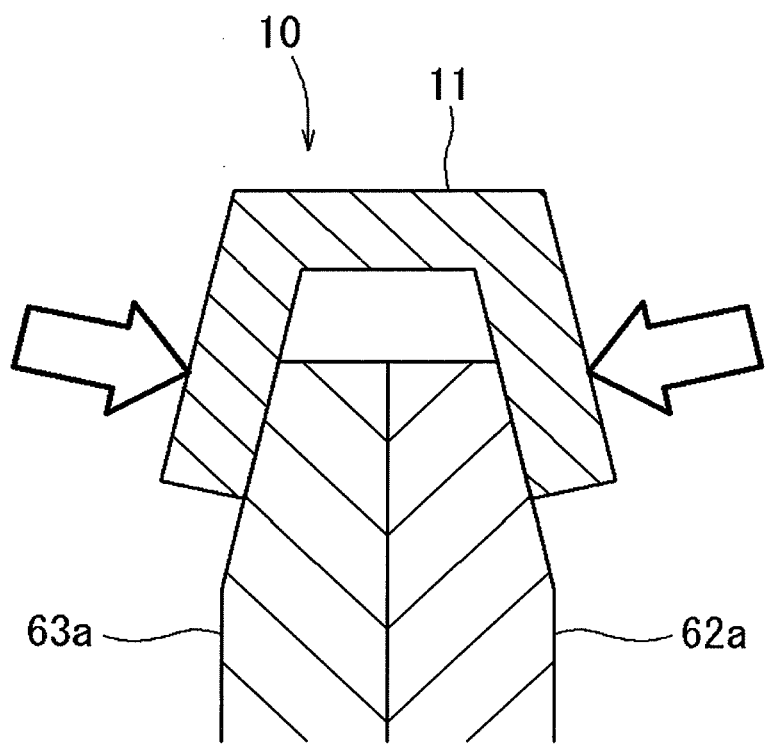
FIG. 12 is a fragmentary enlarged sectional view of the clamp coupling of FIG. 10, showing a state in which a new clamp coupling is used.

FIG. 12 shows a state in which the flange portions 62a, 63a are connected together by a new clamp coupling 10. The new clamp coupling 10 is also made of spring steel having a spring force that is indicated by arrows and strong enough to connect the flange portions 62a, 63a securely.

Figure 13:
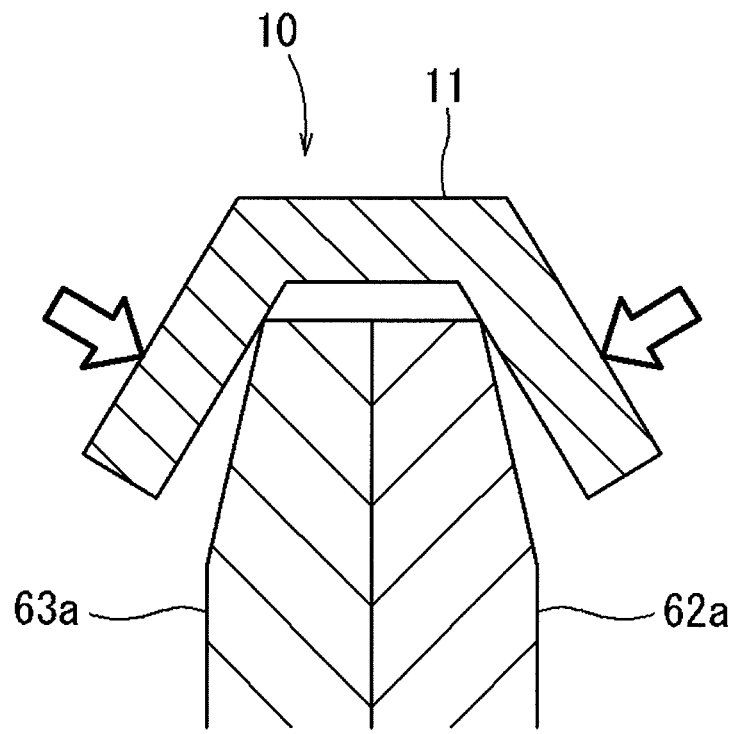
FIG. 13 is a fragmentary enlarged sectional view of the clamp coupling of FIG. 10, showing a state in which the clamp coupling is reused.

FIG. 13 shows a state in which the flange portions 62a, 63a are connected by a reused clamp coupling 10. Since the clamp segments 11 of the clamp coupling 10 have been exposed to exhaust gas heat, the spring force of the clamp segments 11 is reduced. For this reason, as indicated by small arrows, the clamp segments 11 may fail to be fastened securely as compared with the state shown in FIG. 12. As measures to prevent the above problem, the connecting force of the clamp segments 11 at the flange portions 62a, 63b is increased by shortening the circumferential length of the clamp segments 11, as shown in FIG. 4. Reduced spring force may be compensated for by reducing the circumferential length of the clamp segments 11.

Figure 14:
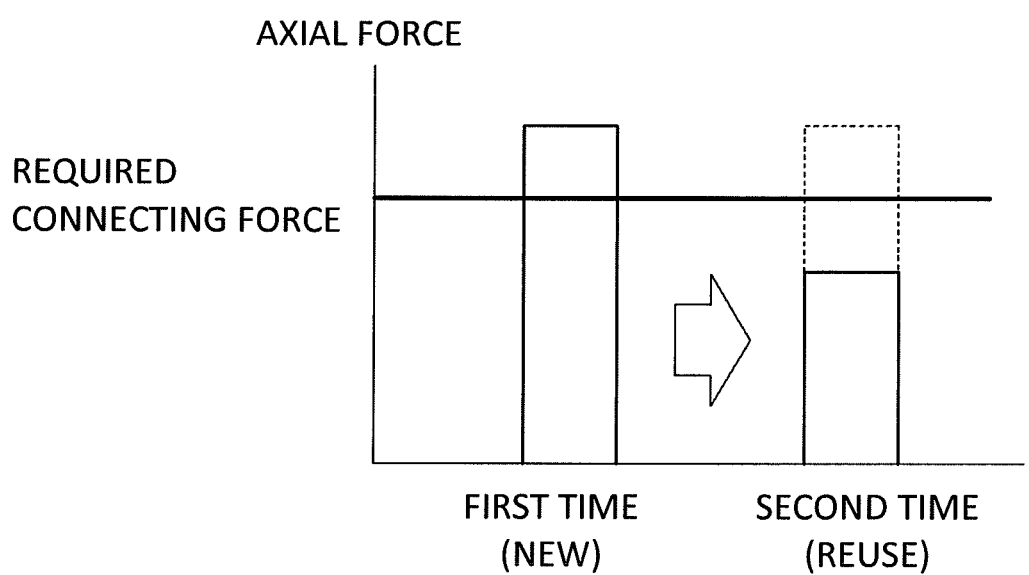
FIG. 14 is a graph showing a change of the axial force of the clamp coupling of FIG. 1.

FIG. 14 shows a graph illustrating the axial force acting in the direction in which the flange portions 62a, 63a are fastened in connecting the cylindrical cases 62, 63 of the exhaust gas purifying device of FIG. 10 by the clamp coupling 10 according to the present embodiment. In fastening the flange portions 62a, 63a by use of a new clamp coupling 10, the connecting force of a predetermined magnitude may be ensured as shown by a bar indicated by FIRST TIME in FIG. 14. In this case, the second bend portions 11d have the shim 14 therebetween as shown in FIG. 3.

If the clamp coupling 10 is reused with the shim 14 held between the second bend portions 11d, the connecting force of the clamp coupling 10 fails to reach the required level which is indicated by a horizontal bold line, as shown by a short bar at SECOND TIME in FIG. 14. However, if the shim 14 is removed from the clamp coupling 10 in connecting the flange portions 62a, 63a, the required connecting force is ensured as shown by the dotted line at SECOND TIME in FIG. 14.

Figure 6:
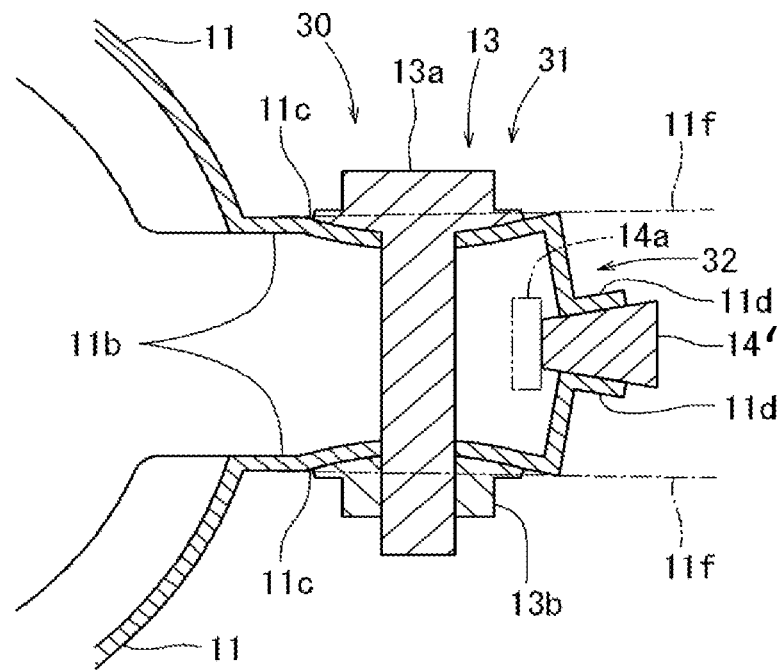
FIG. 6 is a fragmentary enlarged sectional view, showing the second connecting section of FIG. 3.
Figure 7:
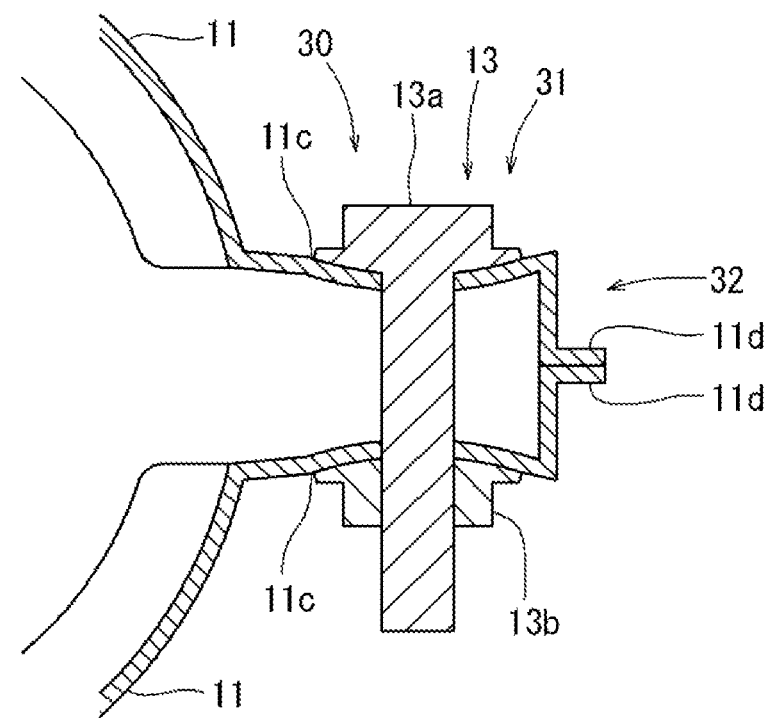
FIG. 7 is a fragmentary enlarged sectional view similar to FIG. 6, showing the second connecting section in which the shim is removed.

FIGS. 6 and 7 correspond to FIGS. 3 and 4, respectively, showing the second connecting sections 30. As shown in FIG. 6, the shim 14' has a wedge shape that tapers toward the fastening section 31. The second bend portions 11d are deformed so that the spaced distance between the second bend portions 11d is reduced toward the fastening section 31 because the second bend portions 11d are bent such that the second bend portions 11d are in surface contact with each other without the shim 14' disposed therebeteween. When the spaced distances between the first bend portions 11b and between the second bend portions 11d are increased, as shown in FIG. 6, a general surface 11f that is a plate portion of the first bend portion 11b is spread toward the outside of the ring shape of the clamp segments 11. Therefore, the second bend portions 11d are inclined such that the spaced distance therebetween is reduced toward the fastening section 31. Accordingly, the wedge-shaped shim 14' is allowed to be in surface contact with the second bend portions 11d. As a result, the clamp segments 11 may be fastened appropriately by the bolt 13a and the nut 13b.

Figure 8:
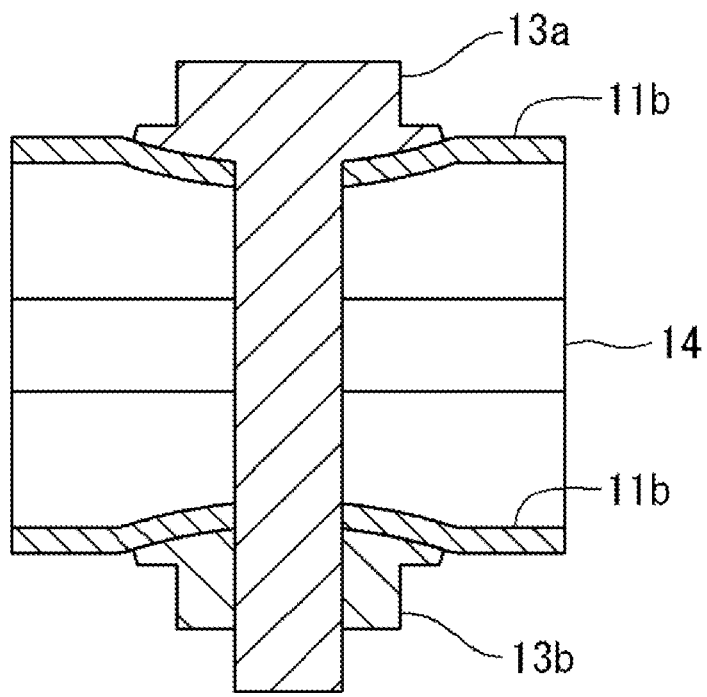
FIG. 8 is a sectional view taken along the line VIII-VIII of FIG. 2.

As shown in FIGS. 5 to 8, the seating surfaces of the bolt 13a and of the nut 13b are spherical and the receiving surfaces formed in the first bend portions 11b are spherical complementary to the respective seating surfaces, so that the seating surfaces of the bolt 13a and of the nut 13b fit in the respective receiving surfaces snugly as shown in FIG. 8. Referring to FIG. 6, the spaced distance between the first bend portions 11b adjacent to the second bend portions 11d is larger than that remote from the second bend portions 11d, so that the second bend portions 11d are inclined with respect to the plate portions of the first bend portions 11b. Therefore, the normal direction of the general surfaces 11f, or the plate portions of the first bend portions 11b is inclined with respect to the axis of the bolt 13a. If the seating surface of the bolt 13a and its corresponding receiving surface of the first bend portion 11b and the seating surface of the nut 13b and its corresponding receiving surface of the first bend portion 11b are all formed flat, the seating surfaces and the receiving surfaces are brought into partial contact with each other at a position adjacent to the second bend portions 11d, respectively. However, according to the present embodiment in which the seating surfaces and the receiving surfaces have a spherical surface, the seating surfaces and the receiving surfaces are in surface contact with each other without partial contact. As a result, the clamp segments 11 may be fastened appropriately by the bolt 13a and the nut 13b.

Figure 9:
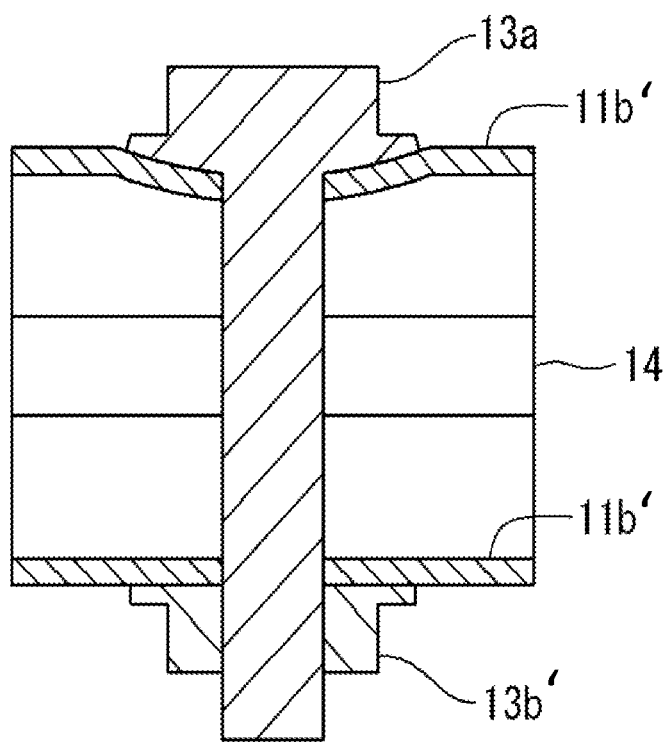
FIG. 9 is a sectional view similar to FIG. 8, showing another example of clamp coupling.

In a case in which the seating surface of either one of the bolt 13a and the nut 13b is not rotatable relative to the receiving surface of the first bend portions 11b, the one seating surface and its corresponding receiving surface may be formed to have an arch surface that faces in the direction opposite to the arch shape of the clamp segment 11 having an annular shape. FIG. 9 shows a modified example in which the seating surface of the nut 13b' is not rotatable relative to the receiving surface of the first bend portions 11b'. In FIG. 9, the seating surface of the nut 13b' and its corresponding receiving surface of the first bend portions 11b' of the clamp segment 11 are not formed spherical, but formed by an arc surface. The arc surface has an arc shape facing in the direction opposite to the arc side of the annular clamp segment 11.

In FIG. 6, another modified example is shown. In the modified example, the shim 14' is formed at the tapered end thereof with an engagement portion 14a that is indicated by phantom line. The engagement portion 14a prevents the shim 14' from being slipped off from the second bend portions 11d by being brought into engagement with the stepped surface between the first bend portions 11b and the second bend portions 11d. Therefore, the shim 14' is hardly removed from a state in which the second bend portions 11d hold the shim 14' therebetween.

In the present embodiment, depending on whether the shim 14 is held in the contact section 32 or not, the distance between the second bend portions 11d of the paired clamp segments 11 as fastened is changed. Specifically, the spaced distance between the first bend portions 11b may be reduced. Thus, the circumferential length of the paired clamp segments 11 connected in a ring shape is adjustable. When the connecting force of the clamp segments 11 becomes insufficient, the circumferential length of the pair clamp segments 11 may be shortened to increase the connecting force of the clamp coupling 10. That is, the reuse clamp coupling 10 may be used to connect the objects such as the cylindrical cases 61, 62, 63.

According to the present invention, the number of the clamp segments constituting one clamp coupling may be two or more. The number of objects to be connected by one clamp coupling may be two or more. The number of the first connecting section and the number of the second connecting section may be two or more, respectively. The changing means that is disposed between one ends of the clamp segments may be provided by a shim, a spacer, or a wedge. The changing means may be constituted by a screw that permits the spaced distance between one ends of the clamp segments to be changed by the screwing amount of a screw. Specifically, internally threaded holes are formed through one ends of the clamp segments and an externally threaded screw engaged with the threaded holes is screwed thereby to change the spaced distance between one ends of the clamp segments. The fastening section may be constituted by a bolt, a nut or a butterfly nut. The internal threads may be formed at the ends of the clamp segments. That is, the internal thread may be directly formed through the ends of the clamp segments.

The DPF need be cleaned and refreshed as required. For cleaning, the DPF need be removed. According to the present invention, in reconnecting the cylindrical cases after cleaning of the DPF, the removed clamp coupling may be reused, which means that the clamp coupling need not be replaced with a new clamp coupling each time the DPF has been cleaned.

According to the present invention, a plurality of shims may be prepared so that circumferential length of the combined clamp segments in a circle is adjustable by the selection of a shim having an appropriate thickness.

Clamping segments of a new clamp coupling having a sufficient spring force for connecting a plurality of connecting objects may be used with a long circumferential length. In using a reuse clamp coupling with clamp segments having an insufficient spring force, adjustment is made so that the circumferential length of the combined clamp segments is shortened. According to the present invention, a shim is held between one ends of the clamp segments to increase the circumferential length of the clamp segments and the shim is removed to shorten the circumferential length. In the former case, though, it is difficult to bring the ends of the clamp segments into contact with each other, the presence of the shims in the contact section allows the ends to be set into contact with each other. By fastening the clamp ends with a fastener, the clamp segments are elastically deformed while holding the connecting objects to ensure the required connecting force. In the latter case, on the other hand, it is easy for the ends of the clamp segments to be brought into contact with each other, so that sufficient contact force is obtained between the clamp segment ends without shims in the contact section. By fastening the clamp segments at the ends thereof, the clamp segments are deformed more than in the former case, with the result that the connecting objects are connected together with sufficient connecting force.

Although the present invention has been described with reference to specific embodiments and examples, but may be modified into various alternative embodiments. The clamp coupling of the invention is applicable to various connecting objects, for example, to an exhaust pipe of a diesel engine, any connecting object of a gasoline engine or any equipment other than the engines.

What is claimed is:

1. A clamp coupling comprising:
a plurality of clamp segments including respective grooves each having a U or V sectional shape, the plural clamp segments being connected in a ring shape with the grooves facing inward of the ring shape, the clamp segments being configured to hold a plurality of objects to be connected in the grooves and connect the objects; and
a connecting section having a first connecting section and a second connecting section for connecting the clamp segments,
wherein the first connecting section is configured to serve as a hinge that permits the clamp segments to be opened from and closed to the ring shape,
wherein the second connecting section is configured to connect the plural clamp segments and to permit adjustment of a circumferential length of the plural clamp segments having the ring shape,
wherein the second connecting section includes a fastening section and a contact section disposed outward of the ring shape from the fastening section,
wherein the contact section connects the clamp segments at one ends thereof in direct or indirect contact with each other and includes a spaced-distance changer to change a spaced distance between the one ends of the clamp segments,
wherein the fastening section includes an externally threaded body inserted through the one ends and an internally threaded body screwed with the externally threaded body for holding the one ends and fastening the clamp segments thereby to reduce the spaced distance between the one ends of the clamp segments and connect the objects held in the grooves,
wherein the fastening section includes a bolt and a nut, and
wherein a seating surface of the bolt, a seating surface of the nut, and receiving surfaces of the clamp segments opposed to the respective seating surfaces are formed of a curved surface so that the seating surfaces and the corresponding receiving surfaces are in surface contact with each other if a normal direction of a plate portion of each clamp segment is inclined with respect to an axis of the bolt.

2. The clamp coupling according to claim 1, wherein the spaced-distance changer is a shim that is held in the contact section between the one ends of the clamp segments, and wherein the shim is formed with an engagement portion that engages with the clamp segments so as not to be slipped off a state in which the one ends of the clamp segments hold the shim.

3. The clamp coupling according to claim 1, wherein the plurality of clamp segments are made of spring steel.

4. The clamp coupling according to claim 1, wherein the objects are cylindrical cases through which exhaust gas of a diesel engine flows, wherein one of the cylindrical cases accommodates a diesel particulate filter for purifying exhaust gas of the diesel engine, and wherein the clamp segments are configured to hold flange portions of the cylindrical cases to be connected in the grooves and connect the cylindrical cases.

5. A clamp coupling comprising:
a plurality of clamp segments including respective grooves each having a U or V sectional shape, the plural clamp segments being connected in a ring shape with the grooves facing inward of the ring shape, the clamp segments being configured to hold a plurality of objects to be connected in the grooves and connect the objects; and
a connecting section having a first connecting section and a second connecting section for connecting the clamp segments,
wherein the first connecting section is configured to serve as a hinge that permits the clamp segments to be opened from and closed to the ring shape,
wherein the second connecting section is configured to connect the plural clamp segments and to permit adjustment of a circumferential length of the plural clamp segments having the ring shape,
wherein the second connecting section includes a fastening section and a contact section disposed outward of the ring shape from the fastening section,
wherein the contact section connects the clamp segments at one ends thereof in direct or indirect contact with each other and includes a spaced-distance changed to change a spaced distance between the one ends of the clamp segments, wherein the fastening section includes an externally threaded body inserted through the one ends and an internally threaded body screwed with the externally threaded body for holding the one ends and fastening the clamp segments thereby to reduce the spaced distance between the one ends of the clamp segments and connect the objects held in the grooves, wherein the second connecting section is configured that the one ends of the clamp segments are formed in a flat plate shape and bent so as to extend radially outward of the ring shape of the clamp segments, wherein the second connecting section includes a bend section in which the flat plate-shaped ends of the clamp segments are disposed facing each other, wherein the contact section is disposed on the one ends side of the bend section, and wherein flat plate portions of the contact section hold a shim as the spaced-distance changer therebetween so that spaced distance between the flat plate portions of the contact section is adjustable, and wherein the shim has a wedge shape that tapers toward the fastening section.

6. The clamp coupling according to claim 5, wherein the fastening section includes a bolt and a nut, and wherein a seating surface of the bolt, a seating surface of the nut, and receiving surfaces of the clamp segments opposed to the respective seating surfaces are formed of a curved surface so that the seating surfaces and the corresponding receiving surfaces are in surface contact with each other if a normal direction of a plate portion of each clamp segment is inclined with respect to an axis of the bolt.

7. The clamp coupling according to claim 5, wherein the spaced-distance changer is a shim that is held in the contact section between the one ends of the clamp segments, and wherein the shim is formed with an engagement portion that engages with the clamp segments so as not to be slipped off a state in which the one ends of the clamp segments hold the shim.

8. The clamp coupling according to claim 5, wherein the plurality of clamp segments are made of spring steel.

9. The clamp coupling according to claim 5, wherein the objects are cylindrical cases through which exhaust gas of a diesel engine flows, wherein one of the cylindrical cases accommodates a diesel particulate filter for purifying exhaust gas of the diesel engine, and wherein the clamp segments are configured to hold flange portions of the cylindrical cases to be connected in the grooves and connect the cylindrical cases.

10. A method of fastening a clamp coupling, wherein the clamp coupling includes a plurality of clamp segments including respective grooves each having a U or V sectional shape, the plural clamp segments being connected in a ring shape with the groove facing inward of the ring shape, the clamp segments being configured to hold a plurality of objects to be connected in the grooves and connect the objects; and a connecting section having a first connecting section and a second connecting section for connecting the clamp segments, wherein the first connecting section is configured to serve as a hinge that permits the clamp segments to be opened from and closed to the ring shape, wherein the second connecting section is configured to connect the plural clamp segments and to permit adjustment of a circumferential length of the plural clamp segments having the ring shape, wherein the second connecting section includes a fastening section and a contact section disposed outward of the ring shape from the fastening section, wherein the contact section connects the clamp segments at one ends thereof in direct or indirect contact with each other and includes a spaced-distance changer to change a spaced distance between the one ends of the clamp segments, and wherein the fastening section includes an externally threaded body inserted through the one ends and an internally threaded body screwed with the externally threaded body for holding the one ends and fastening the clamp segments thereby to reduce the spaced distance between the one ends of the clamp segments and connect the objects held in the grooves, wherein the fastening section includes a bolt and a nut, and wherein a seating surface of the bolt, a seating surface of the nut, and receiving surfaces of the clamp segments opposed to the respective seating surfaces are formed of a curved surface so that the seating surfaces and the corresponding receiving surfaces are in surface contact with each other if a normal direction of a plate portion of each clamp segment is inclined with respect to an axis of the bolt, the method comprising:

holding a shim as the spaced-distance changer in the contact section between the one ends of the clamp segments in a case that adjustment is made so that the circumferential length of the plural clamp segments connected in the ring shape is increased; and removing the shim from the contact section so that the one ends of the clamp segments are brought into direct contact with each other in a case that adjustment is made so that the circumferential length of the clamp segments is shortened.

11. A method of fastening a clamp coupling, wherein the clamp coupling includes a plurality of clamp segments including respective grooves each having a U or V sectional shape, the plural clamp segments being connected in a ring shape with the groove facing inward of the ring shape, the clamp segments being configured to hold a plurality of objects to be connected in the grooves and connect the objects; and a connecting section having a first connecting section and a second connecting section for connecting the clamp segments, wherein the first connecting section is configured to serve as a hinge that permits the clamp segments to be opened from and closed to the ring shape, wherein the second connecting section is configured to connect the plural clamp segments and to permit adjustment of a circumferential length of the plural clamp segments having the ring shape, wherein the second connecting section includes a fastening section and a contact section disposed outward of the ring shape from the fastening section, wherein the contact section connects the clamp segments at one ends thereof in direct or indirect contact with each other and includes a spaced-distance changer to change a spaced distance between the one ends of the clamp segments, and wherein the fastening section includes an externally threaded body inserted through the one ends and an internally threaded body screwed with the externally threaded body for holding the one ends and fastening the clamp segments thereby to reduce the spaced distance between the one ends of the clamp segments and connect the objects held in the grooves, wherein the second connecting section is configured that the one ends of the clamp segments are formed in a flat plate shape and bent so as to extend radially outward of the ring shape of the clamp segments, wherein the second connecting section includes a bend section in which the flat plate-shaped ends of the clamp segments are disposed facing each other, wherein the contact section is disposed on the one ends side of the bend section, wherein flat plate portions of the contact section hold a shim as the spaced-distance changer therebetween so that spaced distance between the flat plate portions of the contact section is adjustable, and wherein the shim has a wedge shape that tapers toward the fastening section, the method comprising:

holding the shim as the spaced-distance changer in the contact section between the one ends of the clamp segments in a case that adjustment is made so that the circumferential length of the plural clamp segments connected in the ring shape is increased; and removing the shim from the contact section so that the one ends of the clamp segments are brought into direct contact with each other in a case that adjustment is made so that the circumferential length of the clamp segments is shortened.

* * * * *